United States Patent [19]

Gregory

[11] Patent Number: 4,644,933

[45] Date of Patent: Feb. 24, 1987

[54] SOLAR SYSTEM

[76] Inventor: Samuel T. Gregory, P.O. Box 148, Scotland Neck, N.C. 27874

[21] Appl. No.: 791,981

[22] Filed: Oct. 28, 1985

[51] Int. Cl.⁴ ............................................... F24J 2/38
[52] U.S. Cl. ................................... 126/424; 126/438; 126/440; 126/450
[58] Field of Search ............... 126/438, 439, 440, 424, 126/425, 434, 443, 450

[56] References Cited

U.S. PATENT DOCUMENTS

| 1,873,854 | 8/1932 | Wheeler | 126/434 |
| 1,989,999 | 2/1935 | Niederle | 126/424 |
| 4,108,154 | 8/1978 | Nelson | 126/438 |
| 4,191,164 | 3/1980 | Kelly | 126/439 |
| 4,307,712 | 12/1981 | Tracy | 126/424 |
| 4,452,234 | 6/1984 | Withjack | 126/424 |

FOREIGN PATENT DOCUMENTS 113955  9/1981  Japan ................................. 126/439

Primary Examiner—James C. Yeung
Attorney, Agent, or Firm—Mills & Coats

[57] ABSTRACT

This invention is an improved solar collector which combines a magnifying lense with separate reflectors to obtain maximum solar energy collection. The collector also tracks celestial movement so as to constantly maintain maximum solar exposure.

8 Claims, 6 Drawing Figures

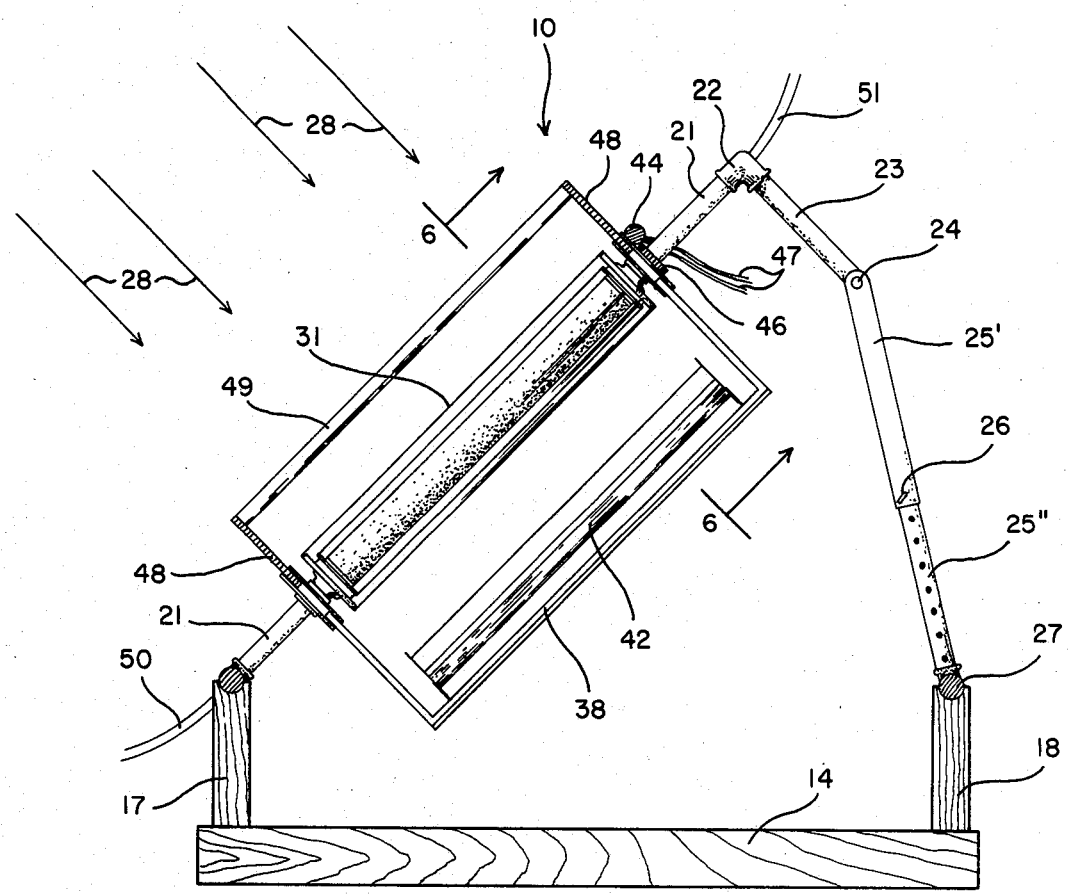
Fig. 4
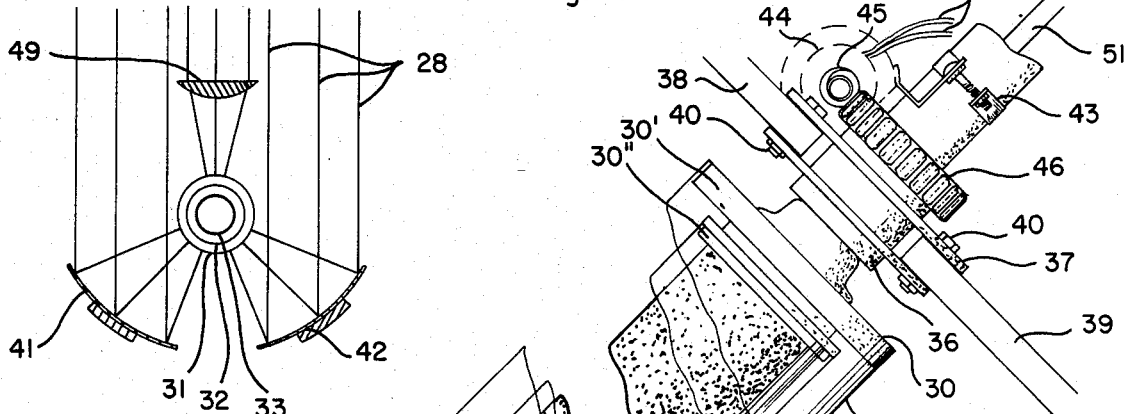
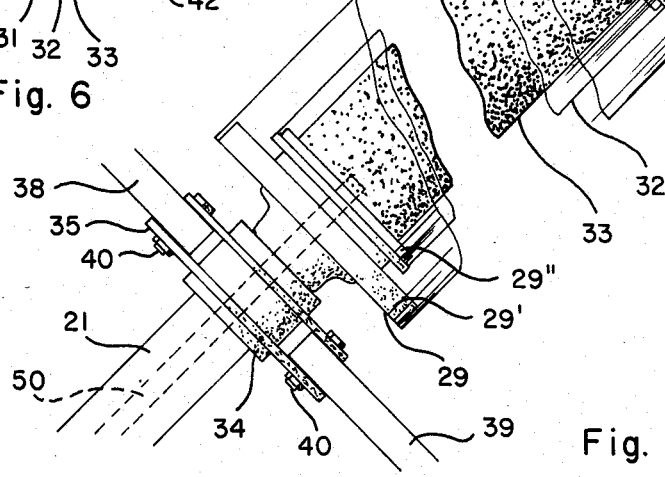
Fig. 6
Fig. 5

SOLAR SYSTEM

FIELD OF INVENTION

This invention relates to energy systems and more particularly to the solar type energy collectors.

BACKGROUND OF INVENTION

Since mankind first began to realize that solar energy could be collected and used, new and more efficient ways of accomplishing the same have been sought. At first simply opening and closing of shade means was used to control the amount of solar energy passively collected. Thereafter more sophisticated active solar systems were developed including plate type collectors with coils having a liquid flowing therethrough. Also, collectors that track solar movement have been designed as well as reflectors and lens concentrators.

Each of the above systems has its own particular advantages as well as disadvantages. The plate collectors are only at one short interval during the day disposed toward the sun for maximum absorption. The tracking collectors, although disposed at optimum solar angle, have heretofore been limited in size due to the required mobility of the same. The reflector units, although quite often used in conjunction with tracking devices, have been found to be only partially successful while the lens concentrators have not been found to have superior qualities.

After much research and study into the above-mentioned problems, the present invention has been developed to provide a solar collector which receives radiation from an area approaching the size of a plate collector, has the benefit of obtaining maximum radiation through tracking, and combines the best features of both reflective and lens concentrators.

The above is accomplished through the provision of a solar collector angularly mounted at ninety degrees to the mean azimuth of the sun. A plurality of reflectors are mounted below and on either side of a collector tube for concentrating solar energy from the peripheral areas. Above the collector tube, at a point just shy of shadowing the reflectors, is a lens concentrator. The combination of the reflectors and lens concentrators covers a wide area and yet directs the radiation falling thereon to the collector tube.

The large area of radiation recovery, coupled with the maximum recovery due to tracking, all combined to provide a superior solar energy collecting means.

In view of the above, it is an object of the present invention to provide an improved solar radiation collecting means in the form of combination reflector and lens concentrators covering a large area with tracking to assure maximum operating efficiency.

Another object of the present invention is to provide satellite concentrating means operatively associated with a solar radiation collector.

Another object of the present invention is to provide, with appropriate installation, a passive circulation system for solar energy collection.

Another object of the present invention is to provide a combination reflector/lens solar concentrator in combination with tracking means.

Another object of the present invention is to provide an optimum solar radiation energy collecting means covering a large solar radiation receiving area.

Other objects and advantages of the present invention will become apparent and obvious from a study of the following description and the accompanying drawings which are merely illustrative of such invention.

BRIEF DESCRIPTION OF FIGURES

FIG. 4 is a side elevational view of said solar collector;

FIG. 5 is an enlarged cutaway view of the concentrator portion of the present invention; and FIG. 6 is a sectional view taken through lines 6—6 of FIG. 4.

DETAILED DESCRIPTION OF INVENTION

Figure 1:
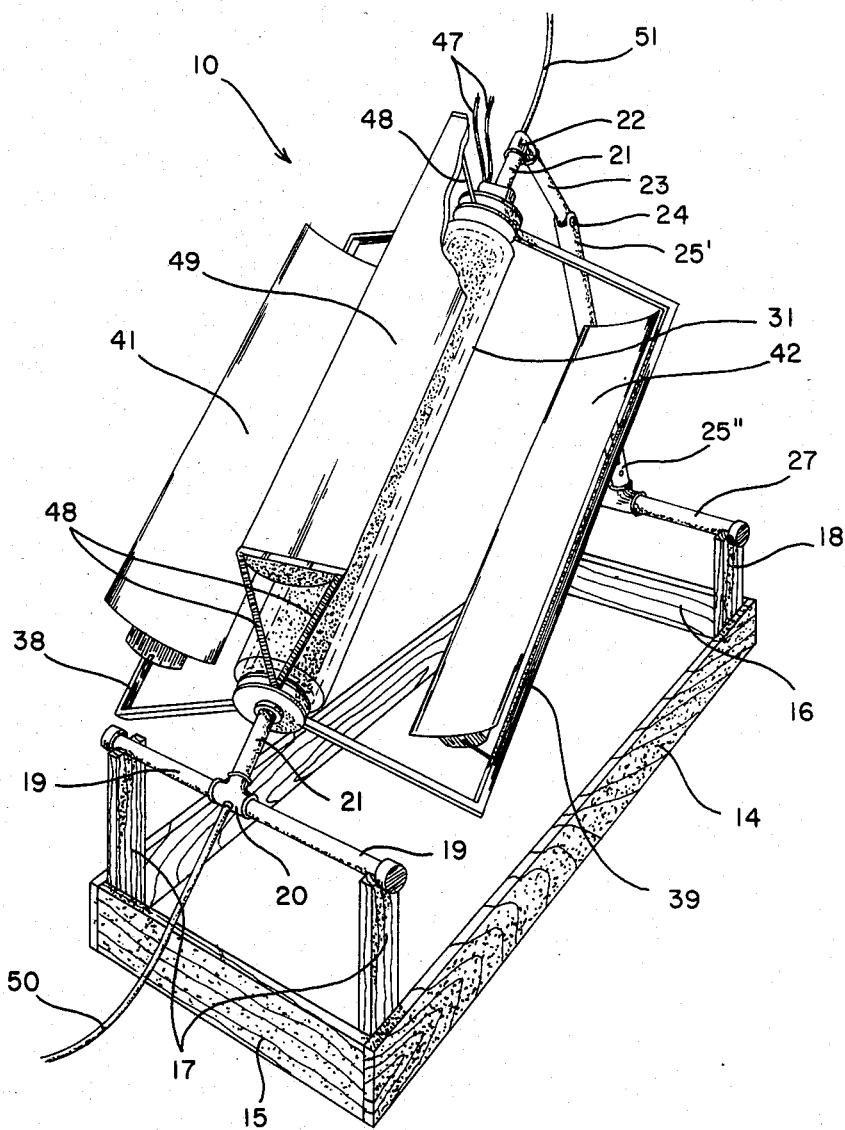
FIG. 1 is a perspective view of the solar collector portion of the present invention.

With further reference to the drawings, the improved solar collector of the present invention, indicated generally at 10, can form part of a passive solar energy collection and storage system, indicated generally at 11, or can be used in conjunction with an active solar energy collection and storage system, indicated generally at 12.

Referring more specifically to the solar collector portion 10 of the present invention, a generally rectangular base formed from generally parallel side members 13 and 14 and end members 15 and 16 is provided. Generally uprightly disposed support legs 17 are secured to the base adjacent end 15 with support legs 18 being secured adjacent end 16 thereof.

A support bar 19 is pivotally mounted between support legs 17 with a T-joint 20 mounted centrally of said support bar.

A support 21 is secured to T-joint 20 at one end and to end cap 29 at the other end. A second support 21' is secured to end cap 30 at one end and to elbow 22 at the other end which in turn mounts downwardly extending support leg 23.

The end of support leg 23, opposite elbow 22, is pivotally mounted as indicated at 24 to the upper portion 25' of adjustable support leg 25. The lower portion 25" of adjustable support leg 25 is adapted to adjustingly telescope within the upper portion 25' as can clearly be seen in FIG. 4. A locking pin 26 is used to fixed the desired adjusted relationship of the upper and lower portions of the support leg. Since locking pins of this type are well known to those skilled in the art, further detailed discussion of the same is not deemed necessary.

The lower portion 25" of adjustable support leg 25 is secured by weldment or other means to support bar 27 which is pivotally mounted between legs 18. Thus it can be seen that periodic adjustments in the length of adjustable support leg 25 will allow the support tube 21 to be maintained at approximately 90 degrees to ambit solar radiation as indicated at 28.

A pair of generally circular end caps 29 and 30 are mounted in space relation to each other on supports 21 and 21' between T-joint 20 and elbow 22 as can clearly be seen in FIG. 4.

An outer, transparent, heat retaining tube 31 is disposed between end caps 29 and 30 and is mounted on respective tube support shoulders 29' and 30'.

A second or inner, transparent, heat retaining tube 32 is disposed between end caps 29 and 30 and is mounted on inner shoulders 29" and 30". A heat absorbing tube 33 has preferably a flat black outer surface and is mounted between end caps 29 and 30 interiorly of inner heat retaining tube 32.

A bearing means 34 is mounted on support tube 21 adjacent end cap 29 and rotatively mounts lens/reflector bracket 35. A second bearing means 36 is mounted on collector tube 21 adjacent end cap 30 and rotatively mounts lens/reflector bracket 37. Since brackets and mounting bearings of the type here described are well known to those skilled in the art, further detailed discussion of the same is not deemed necessary.

A pair of generally U-shaped reflector supports 38 and 39 extend between and are secured to rotatable brackets 35 and 37 by means such as bolts 40.

A pair of concave mirrors or reflectors 41 and 42 are mounted, respectively, on reflector supports 38 and 39. Although the mounting of the parabolic reflectors on their respective supports can be either fixed or adjustable, adjustable mounting is considered preferable since it allows fine tuning of the solar collecting means of the present invention. Since fixed and adjustable mounts of the type described are well known to those skilled in the art, further detailed discussion of the same is not deemed necessary.

Lens supports 48 are secured to brackets 35 and 37 in a manner similar to reflector supports 38 and 39. These lens supports 48 are secured at their ends opposite brackets 35 and 37 to solar radiation concentrating lens 49. Since lens of this type are well known to those skilled in the art, further detailed discussion of the same is not deemed necessary.

Bracket 43 is secured to collector tube 21 and mounts motor 44. Worm drive 45, which is operatively driven by motor 44, is in operative engagement with gear wheel 46 which is mounted on lens/reflector bracket 37. Thus it can be seen that when electricity is applied to motor 44 through wires 47, worm drive 45 through its operative engagement with gear wheel 46, will turn bracket 37 and through its connection with supports 38 and 39, will turn bracket 35 thus moving in unison both the parabolic reflectors 41 and concentrating lens.

An inlet line 50 communicates through end cap 29 with the interior of one end of heat absorbing tube 33 while an outlet line 51 communicates through end cap 30 with the interior of the other end of said heat absorbing tube.

Figure 2:
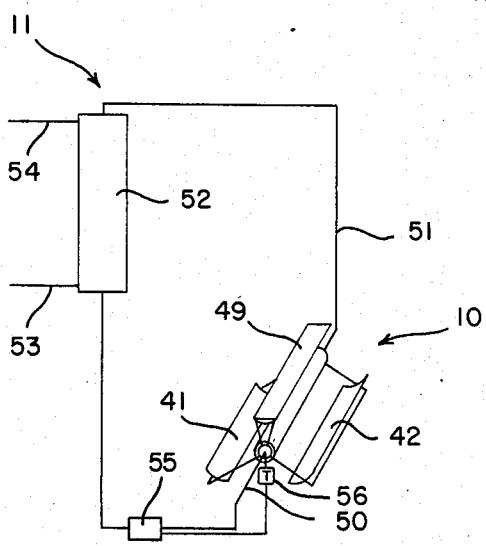
FIG. 2 is a schematic of the passive version of the present invention.

In the passive system shown in FIG. 2, the outlet line 51 from collector 10 moves the heat transfer liquid into a storage tank 52 located above said collector by normal convective flow. The liquid forced from said tank moves back into the collector 10 through the inlet line 50 thus forming a natural flow which does not require any input energy other than solar radiation to transfer heat from the collector to the storage tank. The storage tank, of course, has normal inlets and outlets 53 and 54. Since inlets and outlets of this type are well known to those skilled in the art, further detailed discussion of the same is not deemed necessary.

Figure 3:
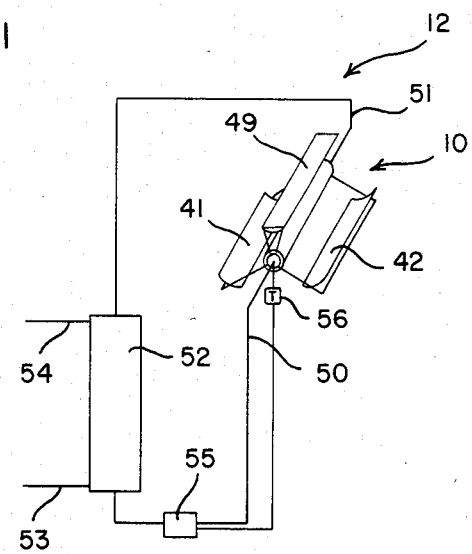
FIG. 3 is a schematic of the active version of the present invention.

The active system disclosed in FIG. 3 (which is used when it is not practical to mount the storage tank 52 above the collector 10) utilizes a circulating pump 55 to move the heat transfer liquid through the system. Since circulating pumps of this type are well known to those skilled in the art, further detailed discussion of the same is not deemed necessary.

A thermostat for the storage tank heater is preferably set between 35 degrees and 40 degrees Fahrenheit. The collector tubes 50 and 51 are well insulated so that a minimum of heat is lost in circulation. Circulating pump 55 is connected to a thermostatic switch on collector tube 50 so that it will circulate the water in the system when the water temperature falls below 35 degrees Fahrenheit to prevent freeze-up. Thus the need for a heat exchanger within the storage tank, which is expensive and involves the possibility of contamination, is illiminated.

To use the solar system of the present invention, support leg 25 is adjusted to perpendicularly align the solar collector 10 with incoming ambit solar radiation 28. Next, the solar collector 10 is rotated axially about support 21 and 21' until the solar rays 28 fall equally on the to reflectors 41 and 42 and the lens 49 as illustrated somewhat schematically in FIG. 6.

The collector drive motor 44 (which can be either a constant slow drive or a step type motor) is activated. This motor's speed is coordinated with the movement of the sun across the sky thus effectively causing the collector 10 to track such celestial body. This tracking causes the equal distribution of solar radiation to be maintained effectively constant (as illustrated in FIG. 6) for maximum solar energy collection.

Heat tube 33 absorbs solar radiation and transfers it to the heat transfer medium flowing through the system of the present invention. If the tank 52 is above the collector 10 as discussed above, passive solar circulation will be accomplished. If the collector 10 is below the level of storage tank 52, then a circulating means 55, with appropriate temperature sensors and controls, would be used. Sensors and controls of the type to operate circulation means are, of course, well known to those skilled in the art, further detailed discussion of the same is not deemed necessary.

From the above it can be seen that the present invention has the advantage of providing a relatively, inexpensive and yet highly efficient solar energy collecting system which can be readily installed, is easy to maintain, and is highly efficient in operation. A plurality of these units can be used to produce an even more efficient solar collecting systems.

The present invention can, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. An improved solar heat collecting system comprising: a collecting means having upper and lower end caps; means for supporting said collecting means in a position generally perpendicular to ambit solar radiations and to permit periodic adjustment thereof; said support means including a base, a first support bar pivotally secured to said base and extending generally parallel to the ground, a first support member extending perpendicular from said first support bar to said lower end cap, a second support bar pivotally secured to said base and extending generally parallel to said first support bar, a support leg having a lower portion that extends perpendicularly from said second support bar, an intermediate leg portion slidingly mounted on said lower leg portion and an upper leg portion pivotally secured to said intermediate leg portion, and a second support member extending perpendicularly from said upper leg portion to said upper end cap; lens means disposed above said collecting means for concentrating solar radiation on said collecting means; a pair of reflector means mounted below and on opposite sides of the radiation shadow of said lens means for concentrating solar radiation on said collecting means; mounting means for mounting said lens means and said reflector means, said mounting means including first and second bracket means rotatively mounted respectively to said first and second support members, a pair of radially extending U-shaped reflector mounts having opposite ends secured to respective bracket means, and a pair of radially extending lens supports secured to respective bracket means; and means for rotating said mounting means and associated lens mean and reflector means to track the source of solar radiation whereby an improved, highly efficient solar heat collecting system is provided.

2. The solar system of claim 1 wherein at least one heat retaining means is provided about said collecting means.

3. The solar system of claim 1 wherein at least two heat retaining means are provided about said collecting means.

4. The solar system of claim 1 wherein a heat absorbing tube forms at least a part of said collecting means.

5. The solar system of claim 1 wherein said reflectors are of the concave mirror type.

6. The solar system of claim 1 including a storage tank communicatively connected to and disposed above said collecting means whereby passive heat transfer from said collecting means to said tank can be accomplished.

7. The solar system of claim 1 wherein said means for rotating said lens means and reflector means to track the source of solar radiation is an electrically operated motor.

8. The solar system of claim 1 wherein said motor is of the step type.

* * * * *